June 21, 1927.

T. W. HAINLINE

INTERNAL COMBUSTION ENGINE

Filed Jan. 27, 1926

Inventor
T. W. Hainline.

By Lacey & Lacey, Attorneys

Patented June 21, 1927.

1,633,323

UNITED STATES PATENT OFFICE.

THEODORE W. HAINLINE, OF PORTLAND, OREGON, ASSIGNOR TO HAINLINE MOTORS CORPORATION, OF PORTLAND, OREGON, A CORPORATION OF OREGON.

INTERNAL-COMBUSTION ENGINE.

Application filed January 27, 1926. Serial No. 84,254.

This invention relates to improvements in internal combustion engines of the reciprocating type and has as its general object to provide an engine of this type which will possess greater efficiency than those now in use.

In one class of internal combustion engines of this type, the explosive charge is pre-compressed and delivered to the power cylinder of the engine, but inasmuch as the pre-compression of the explosive charge necessitates the utilization of a certain amount of the power developed by the engine in its operation, the efficiency of the engine is materially impaired. In engines of the particular class referred to, the pre-compressed charge is suddenly delivered, under expansion, into the power cylinder of the engine and, under these conditions, there is certain to be a commingling of the explosive charge and the exhaust or products of combustion, which further impairs the efficiency of such an engine. Therefore, it is one of the primary objects of the present invention to provide an internal combustion engine, one of the characteristic features of which is the delivery of the explosive charge into the power cylinder of the engine without pre-compression and in a manner to effect discharge of the exhaust without any commingling of the explosive charge and the exhaust, so that no appreciable amount of power is required to effect such delivery of the explosive charge into the power cylinder and the waste of power attending the operation of ordinary two-cycle engines of this class is obviated, with a consequent material increase in efficiency of the engine as well as the increase in efficiency resulting from avoidance of mixture of the explosive charge and the exhaust.

The invention contemplates an internal combustion engine embodying a power cylinder and a power piston working therein, in combination with a charge inducting and delivering cylinder and piston working therein, and another object of the invention is to provide for actuation of the piston of the charge inducting and delivering unit of the engine in such timed relation to the operation of the piston of the power unit of the engine as to effect delivery of the explosive charge from the inducting and delivering unit to the cylinder of the power unit in a manner to preclude any commingling or mixture of the explosive charge and the exhaust, so that the explosive charge is not contaminated with any portion of the exhaust products of combustion, as is the case where the charge is precompressed and suddenly delivered into the cylinder of the power unit.

Another object of the invention is to so proportion and locate the exhaust that it will be capable of the discharge from the cylinder of the power unit of only such volume of gaseous mixture as constitutes the exhaust or products of combustion, so that there will be no likelihood of discharge of any portion of the explosive charge which is delivered, substantially without pressure, into the said cylinder of the power unit.

Another object of the invention is to so construct the engine and to so locate the exhaust with relation to the inlets of the cylinder of the power unit as to provide for operation of the engine without appreciable heating.

Another object of the invention is to so construct the engine that the same will operate substantially without vibration and without any appreciable noise and in which the power delivered to the power shaft of the engine will be of a constant nature, thereby permitting of an exceptionally flexible control of the speed of operation of the engine, which is a most desirable factor in automobile engines and engines for propelling air craft.

Another object of the invention is to provide an engine of the class referred to above which will be exceptionally simple in construction and economical to manufacture, and in which the parts are so constructed and assembled that repairs and replacements, when they become necessary, may be effected with a minimum expenditure of time and labor as well as a minimum cost for materials.

In the accompanying drawings:

Figure 1 is a horizontal sectional view through the engine embodying the invention, the pistons of the power unit and charge inducting and delivering unit being shown in the relative positions which they will occupy substantially at the moment the exhaust is delivered from the cylinder of the power unit and the explosive charge is permitted to flow into the cylinder to assist in expelling the exhaust and prior to the complete delivery of the explosive charge.

Figure 1:
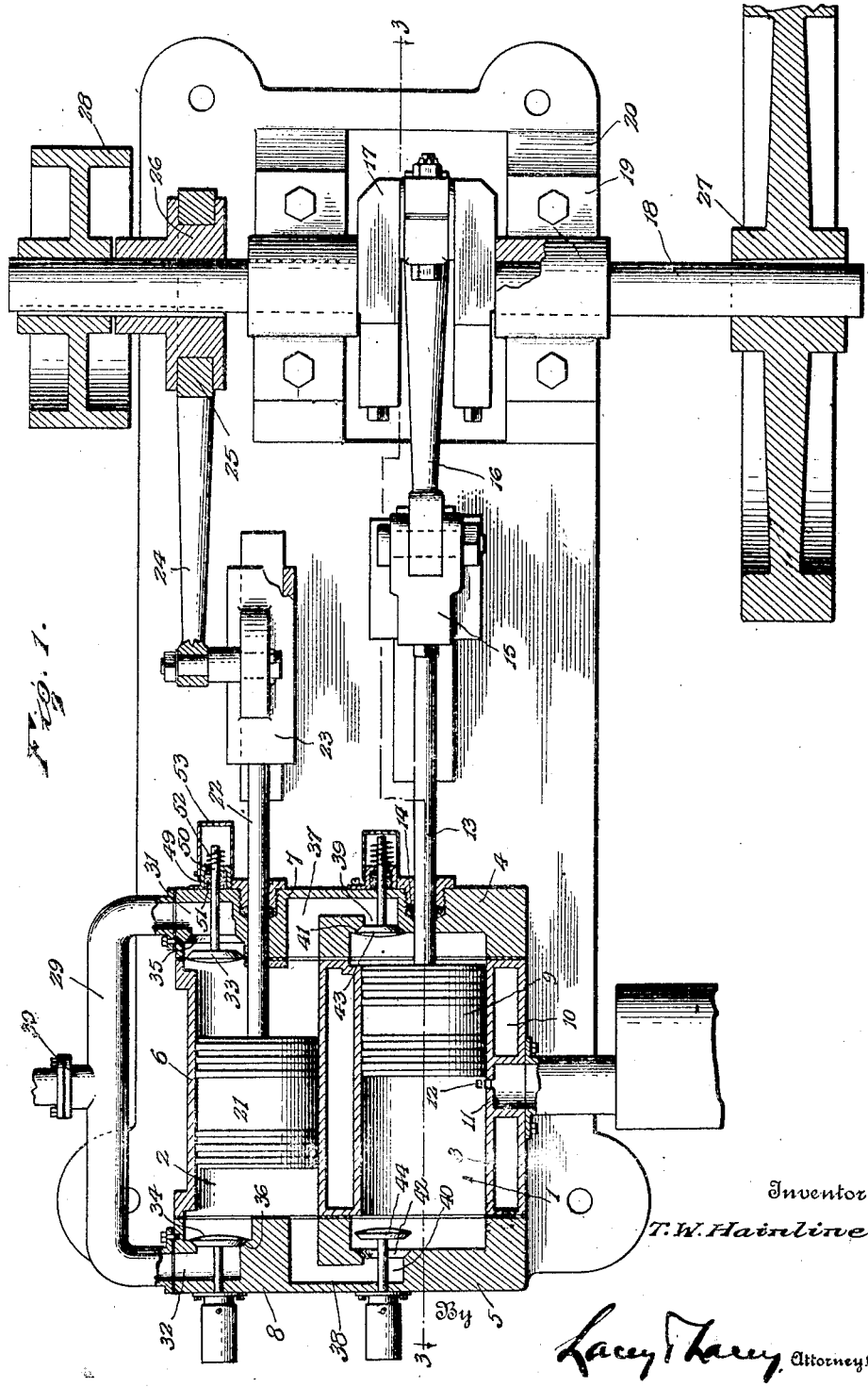

The engine embodying the invention consists primarily of a power unit indicated in general by the numeral 1, and an explosive charge inducting and delivering unit indicated in general by the numeral 2. The power unit comprises a cylinder 3 having heads 4 and 5, and in the illustrated embodiment of the invention, the charge inducting and delivering unit likewise comprises a cylinder which is indicated by the numeral 6, and heads 7 and 8 which are preferably integrally cast or otherwise formed with the heads 4 and 5 respectively, the cylinders being 3 and 6 being likewise preferably integrally formed and having their axes parallel, although the cylinders and the heads of the respective cylinders may respectively be separately formed and the units mounted side by side. Likewise, it will be preferable in practice, to construct the cylinders and heads of the units in the manner illustrated more particularly in Figures 1 and 2 of the drawings, so that by removing the heads, the cylinders may be repaired or replaced. The power unit 1 likewise comprises a piston 9 which is mounted for reciprocation within the cylinder 3, and the cylinder is either wholly or partly surrounded by a water jacket 10, there being a substantially tubular union 11 between the wall of the cylinder and the wall of the water jacket at the point of location of the exhaust from the cylinder, the exhaust being provided by forming one or more exhaust openings 12 in the wall of the cylinder and where several exhaust openings are provided, which will ordinarily be the case, these openings are arranged in a series extending circumferentially of the cylinder wall within the bounds of the tubular union 11. By thus arranging the exhaust openings, portions of the cylinder wall 3 are left intact between relatively adjacent openings so that the rings of the piston 9 will not be liable to catch or hang in the openings. The manner in which the exhaust openings 12 are proportioned in accordance with other factors which determine the successful operation of the engine, will presently be more specifically explained.

A piston rod 13 extends from the piston 9 and through a stuffing box 14 of the ordinary type assembled with the head 4 of the cylinder 3 and this rod is connected to a cross head or slide 15 of the usual construction, and a connecting rod 16 is connected to the said slide and to the crank 17 of the power or crank shaft 18 of the engine, this shaft being mounted in suitable bearings 19 upon a foundation 20, which foundation likewise supports the units 1 and 2, as well as the guide or mounting for the slide 15.

The numeral 21 indicates the piston of the charge inducting and delivering unit 2 and this piston works within the cylinder 6 and has connected to it a rod 22, in turn connected with a slide 23 mounted upon a suitable guide upon the foundation 20, a connecting rod 24 being connected to the said slide 23 and to the collar 25 of an eccentric 26 which is fixed upon the crank shaft 18. A flywheel 27 is likewise fixed upon the crank or power shaft and a pulley 28 is also fixed upon the said shaft. All of these mechanical parts may be of any of the well known constructions and their mechanical equivalents may be employed without departing from the spirit of the invention. For example, there are numerous mechanical equivalents which might be employed in lieu of the eccentric so long as they are capable of effecting transmission of motion to the piston 21 of the charge inducting and delivering unit in the manner which will be explained in the description of operation of the engine.

The numeral 29 indicates an intake manifold, the inlet of which is indicated by the numeral 30, and is suitably connected with any appropriate type of carbureter (not shown), and the branches of the manifold communicate with inlet ports 31 and 32 formed in the heads 7 and 8 of the unit 2, respectively. These ports are controlled by valves, indicated respectively by the numerals 33 and 34, and these valves may be of any type found suitable for the purposes of the present invention and are here shown as automatic valves and will presently be more specifically described. The seats for the valves 33 and 34 are indicated respectively by the numerals 35 and 36 and inasmuch as the inlet ports 31 and 32 are located in the heads 7 and 8, it is obvious that the inlets are located at the opposite ends of the cylinder 6 of the said unit 2.

Passages 37 and 38 formed partly in the heads 4 and 7 and the heads 5 and 8 of the two units, establish communication between the respective ends of the cylinders of the two units and serve to conduct the explosive mixture from the unit 2 to the power unit 1, in a manner which will presently be set forth. The heads 4 and 5 of the power unit 1 are provided with intake ports 39 and 40 respectively, having valve seats 41 and 42, and valves 43 and 44 are arranged to control the delivery of the explosive charge through the ports 39 and 40 into the corresponding ends of the cylinder 3 of the power unit.

Spark plugs 45 and 46 are fitted into openings 47 and 48 in the heads 4 and 5 respectively of the power unit 1, and the usual conductor wires are led from these plugs to any suitable ignition unit such as employed in connection with engines of this type.

Figure 2:
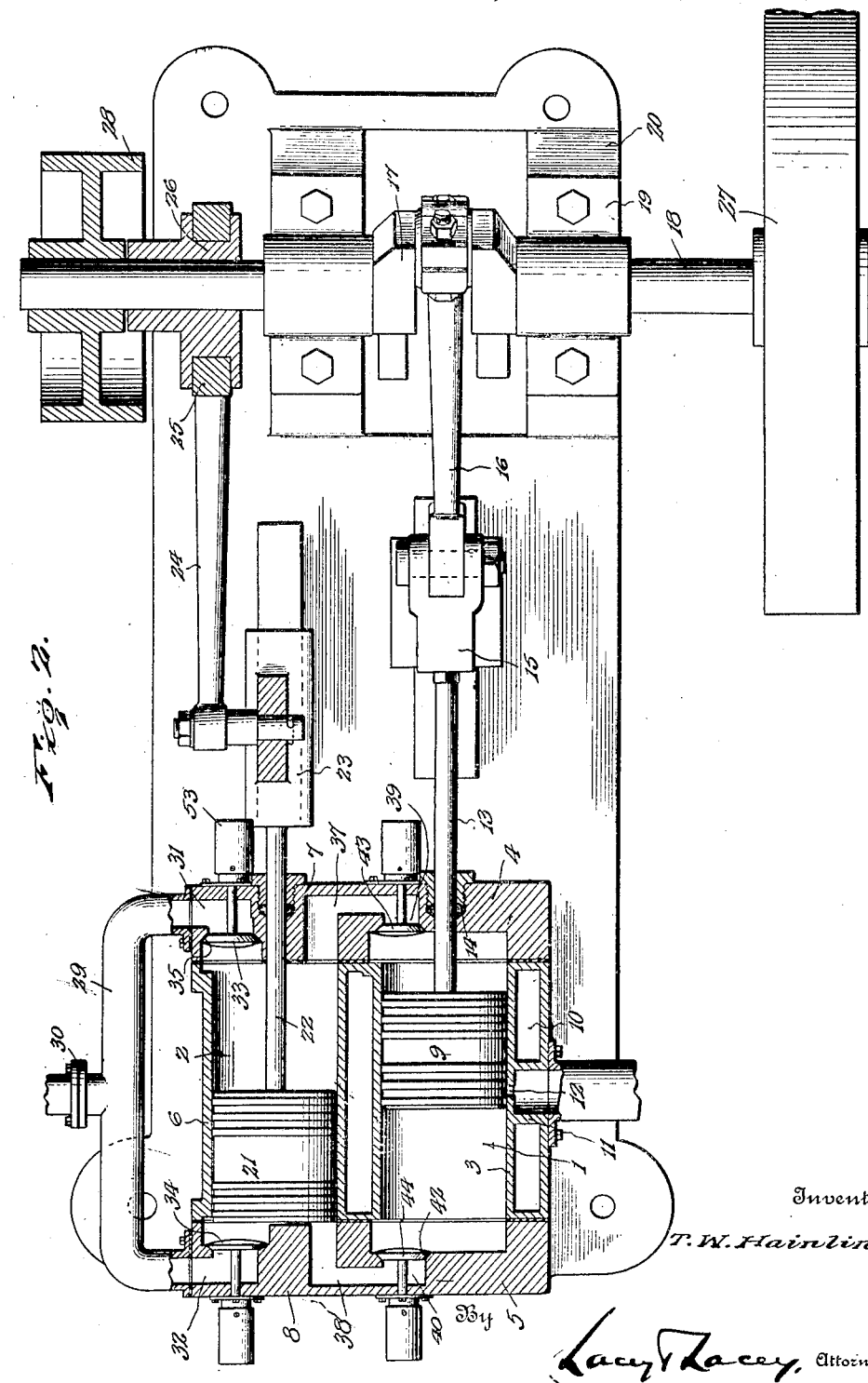
Figure 2 is a similar view illustrating the said pistons in the positions which they will occupy substantially at the moment the charge which has been delivered to the cylinder of the power unit is initially placed under compression.
Figure 3:
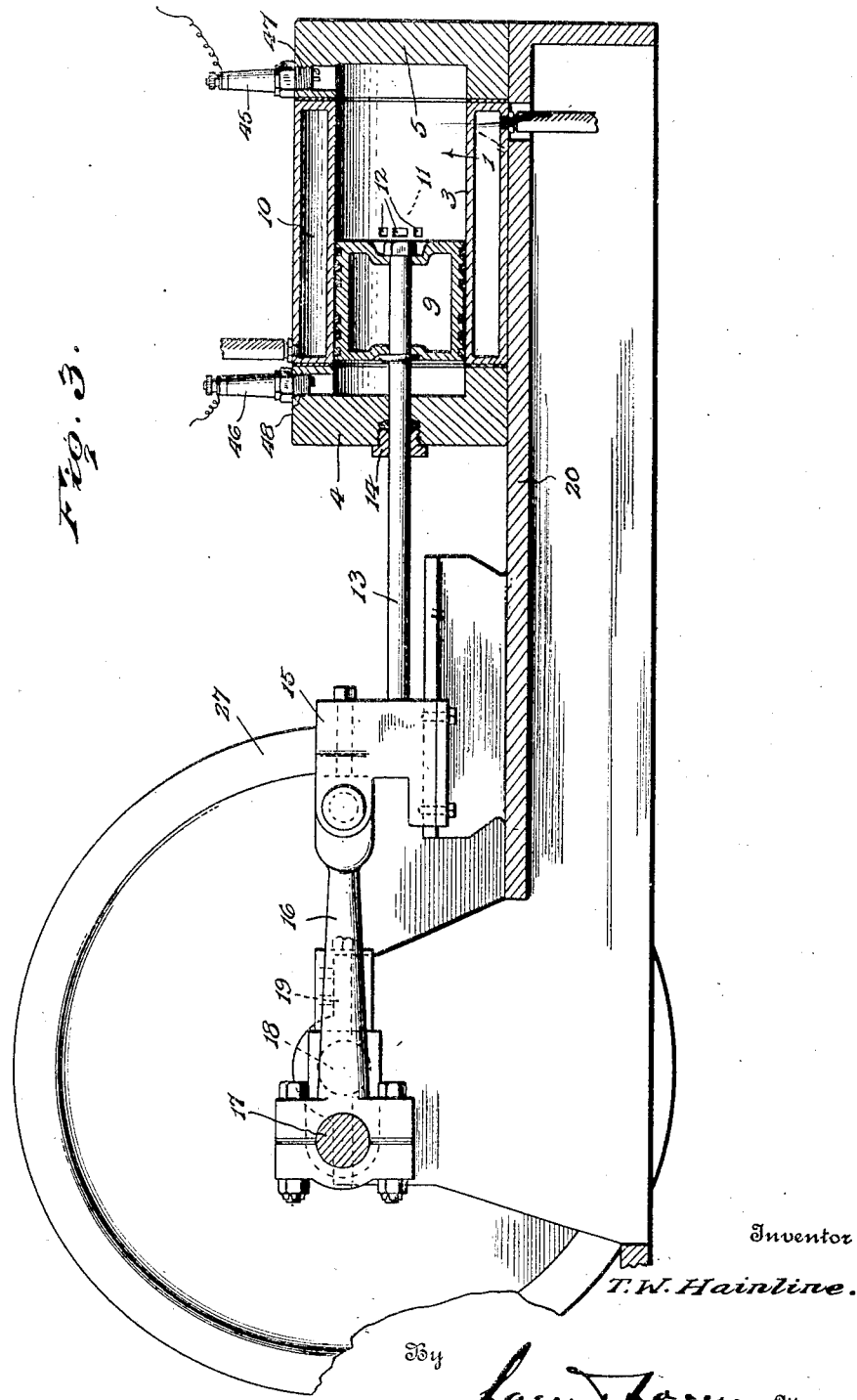
Figure 3 is a vertical longitudinal sectional view through the engine, taken substantially on the line 3—3 of Figure 1, looking in the direction indicated by the arrows.
Figure 4:
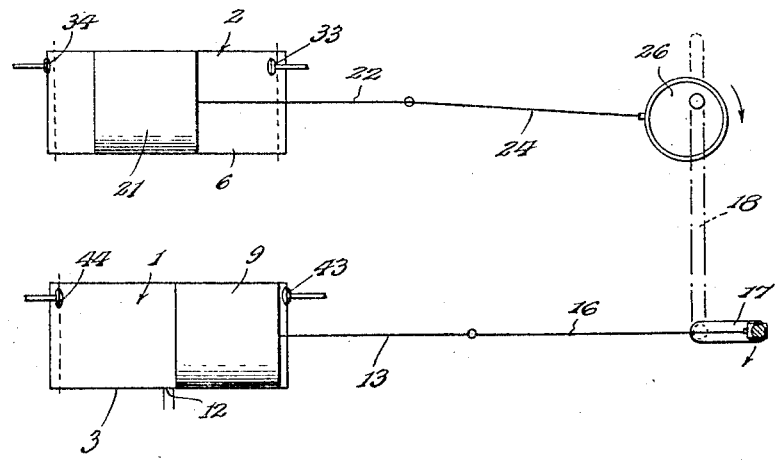
Figure 4 is a diagrammatic view illustrating the pistons of the power unit and charge inducting and delivering unit as shown in Figure 1, and the relative positions of the crank of the power shaft to which the power piston is connected and the actuating means which is associated with the power shaft, for the piston of the charge inducting and delivering unit.
Figure 5:
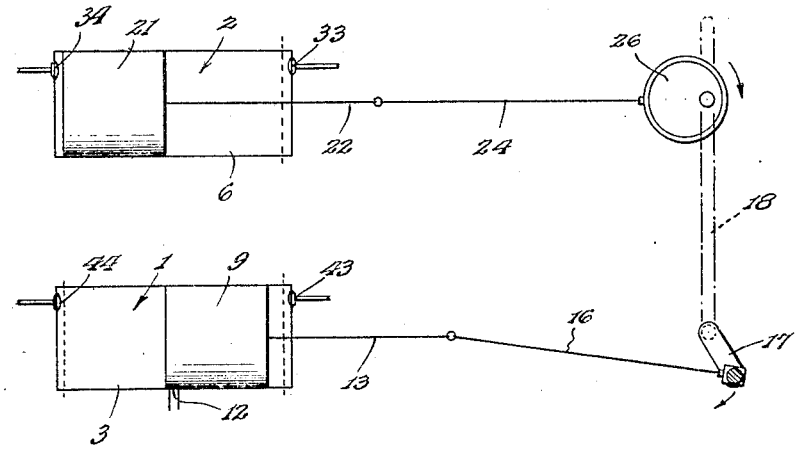
Figure 5 is a similar view illustrating the relative positions of the several parts as shown in Figure 2 of the drawings.

By reference to Figures 4 and 5 of the drawings, it will be observed that the eccentric 26 is set in such position upon the crank shaft 18 that it has a lead with respect to the crank 17, so that while the pistons 9 and 21 operate in consonance with each other in a manner which will now be explained, they do not reciprocate in unison or, in other words, with a like movement. In the positions of the pistons illustrated in Figure 1 of the drawings, the power piston 9 has reached the end of its stroke in the direction of the crank shaft and the crank 17 is on dead center, as most clearly shown in Figure 4 of the drawings, which figure agrees with the showing of Figure 1. At this time, however, the eccentric 26 is in the position shown in Figure 4 and the piston 21 has traveled substantially two-thirds of the length of its stroke in the direction of the head 18 of the unit 2. The length of the piston head 9 is such, as also the stroke of the piston, that at the limits of its stroke, the opposite ends of the piston will uncover the exhaust ports 12 and, as shown in Figure 1, the piston 9, when at the limit of its movement illustrated in said figure, uncovers the said ports. At this moment, the explosive mixture which has been previously delivered into the crank shaft end of the cylinder 3, has been compressed to the maximum, substantially all of the exhaust has been discharged from the opposite end of the cylinder, and the explosive mixture is being delivered into this end of the cylinder, the valve 44 being in open position because of the sudden reduction in pressure in the said end of the working cylinder and the delivery of the fresh charge. Likewise, substantially at this moment, the piston 21 is moving in the direction of the head 8 of the cylinder 6 with a gradually retarded motion as the eccentric 26 rotates toward dead center position, and in this movement of the piston 21 and its immediately preceding period of movement, the explosive charge which has been inducted into the cylinder 6 at the end 8 thereof, is delivered, substantially without compression, by way of the passage 38 and port 40, into the corresponding end of the cylinder 3 of the unit 1. At the moment the previously compressed charge in the opposite end of the cylinder 3 is fired and the piston 9 is driven in the direction of the head 5 of the cylinder 3, the exhaust ports 12 will be instantly closed by the piston 9 and the said piston will compress the charge which has been delivered into the last mentioned end of the cylinder 3 prior to commencement of the next cycle of operation, the valve 44 at such time being automatically closed through the compressive force exerted by the piston 9 against the delivered charge.

It will be observed that the exhaust ports 12 are uncovered substantially at the moment the crank 17 is moving past dead center and it will be evident that as the piston 9 uncovers the ports 12, there will be a sudden outrush of the exhaust, due to the expansion thereof, and the stroke of the piston 9 at this period is so timed through the crank 17, and the area of the exhaust port openings 12 is so proportioned, that during the time the ports are uncovered, precisely that volume of gaseous products represented by the volume of the exhaust, will be permitted to escape from the cylinder 3. In the meantime, the incoming explosive charge serves to displace the exhaust or that portion of the volume thereof which is not expelled through the expansion of the exhaust, and consequently at the moment the exhaust ports 12 are closed or covered by the piston 9 at the beginning of its return or compression stroke, the end of the cylinder into which the charge has been delivered, will have been completely exhausted of the products of combustion from the previously exploded charge. Substantially at this time the crank 17 has passed dead center and has assumed approximately the position shown in Figure 5 of the drawings, the eccentric at such time being on dead center in the direction of the engine, likewis as shown in the said figure. With the crank and eccentric in the stated positions, the piston 9 will be substantially in the position shown in Figure 2, in which position the exhaust ports will be completely closed, and in the continued rotation of the crank shaft, the charge which has been delivered into the end 5 of the cylinder will be compressed, the valve 44 having closed automatically at the beginning of the return stroke of the said piston 9. Likewise, at this time, the piston 21 will be in the position shown in Figure 2, or, in other words, at the limit of its stroke in the direction of the head 8 of the cylinder 6, and in moving to this position a fresh charge of the explosive mixture has been drawn into the opposite end of the cylinder 6, ready for delivery to the corresponding end of the cylinder 3, substantially at the moment the end of the piston head 9 which is next adjacent the power shaft, uncovers the exhaust ports.

It will be evident that on the induction stroke, the piston 21 will be accelerated in its movement.

The valves 33, 34, 43 and 44, are all of the same construction and while, as previously stated, any suitable type of valve may be employed, the drawings illustrate a valve construction which is well adapted to the engine embodying the invention. Each of the valves comprises the usual head and stem, and the stem is slidably fitted through an opening in the head of the cylinder with which the valve is associated and in order to preclude any intake of air about the valve stems and escape of the explosive mixture, as well as to provide for lubrication of the valve stems, a small cylindrical housing 49 is secured to the outer side of the cylinder head through which the valve stem extends and is provided with an opening 50 in its otherwise closed outer end, which opening slidably accommodates the valve stem. Felt or other absorbent material, indicated by the numeral 51, is loosely packed within the housing 49 and supplied in any suitable manner with a lubricant, the valve stem being in this manner constantly supplied with a thin film of the lubricant so as to be sure of smooth reciprocation. A compression spring 52 is fitted upon each valve stem and bears between an abutment upon the outer end of the stem and the closed outer end of the housing 49 and serves to hold the valve to its seat except at such time when it is automatically opened through the operation of the pistons effecting changes in pressure in the gaseous fluid in the cylinders of the units 1 and 2. A cylindrical cap 53 is fitted over the housing 49 and removably secured thereto, and this cap is closed at its outer end so that there can be no accumulation of dust and grit on the valve stems and the springs 52. This likewise further precludes any escape of the explosive mixture as well as the entrance of air and also muffles the sound of the valve impacts.

As previously stated, the exhaust port comprises several openings in the wall of the cylinder 3 arranged as before described and it has been found in the operation of the engine that through the sudden expansion of the exhaust gases at the moment the ports are uncovered, entrance of air by way of these openings is precluded so that there is no liability of flame within the firing chamber, the ports being individually of minimum practical dimensions so that while the exhaust products of combustion will burn exteriorly beyond the ports, there can be no backflash to ignite the incoming charge.

Likewise, it has been found that this sudden expansion of the exhaust gases serves to eliminate nearly all of said gases before the piston 9 has closed the ports so that what small proportion of the gases are not thus expelled, are scavenged by the incoming charge.

It will be evident that inasmuch as the exhaust ports are located midway between the ends of the cylinder 3 and, therefore, remote from the valves 43 and 44 which control the inlet ports, conduction of heat to the ends of the cylinder is reduced to a minimum.

It will also be evident that there is a very considerable saving in fuel consumption in the operation of the engine.

It will be evident that the combustible charge is at a relatively low temperature when delivered to the cylinder 3 of the power unit and that in circulating about the stem 13 of the piston 9, and particularly on the stroke of the piston in the direction of the cylinder head 5, will serve to cool the said stem. Likewise, the explosive mixture will serve to lubricate the piston stems 13 and 22 as well as assist in lubricating the stems of the valves.

Having thus described the invention, what I claim is:

1. In an internal combustion engine, a power cylinder having an inlet port and an exhaust port, a piston slidable in said cylinder and when moved away from the inlet port to a position adjacent the limit of its movement in the said direction uncovering said exhaust port, a valve for said inlet port, a pump cylinder communicating with the power cylinder through the inlet port, a piston in said pump cylinder, a power shaft having motion imparted thereto from the piston of said power cylinder, and means for imparting reciprocating motion to the pump piston from said power shaft at varying rates of speed and in timed relation to movement of the power piston whereby to deliver fuel through the inlet port into the power cylinder without appreciable pressure substantially at the time of uncovering the exhaust port and effect displacement of a spent charge through expansion thereof and entrance of a new charge.

2. In an internal combustion engine, a power cylinder having an inlet port adjacent one end and an exhaust port intermediate its length, a piston in said cylinder slidable longitudinally therein and when moved away from the inlet port to a position adjacent the limit of its movement in the said direction uncovering said exhaust port, a valve for said inlet port normally closed, a pump cylinder communicating with the power cylinder through the inlet port, a piston slidable longitudinally in said pump cylinder, a power shaft having rotary motion imparted thereto from the piston of said power cylinder, and means for imparting reciprocating motion to the pump piston from said power shaft at varying rates of speed and in timed relation to movement of the power piston whereby to deliver fuel through the inlet port into the power cylinder without appreciable pressure substantially at the time of uncovering the exhaust port and effect displacement of a spent charge through expansion thereof and entrance of a new charge.

3. In an internal combustion engine, a power cylinder having an inlet port adjacent one end and an exhaust port intermediate its length, a piston in said cylinder slidable longitudinally therein and when moved away from the inlet port to a position adjacent the limit of its movement in the said direction uncovering said exhaust port, a valve for said inlet port normally closed, a pump cylinder communicating with the power cylinder through the inlet port, a piston slidable longitudinally in said pump cylinder, a power shaft having rotary motion imparted thereto from the piston of said power cylinder, and means for imparting reciprocating motion to the pump piston from said power shaft at varying rates of speed and moving the pump piston in a direction to deliver a charge of fuel to the power cylinder through its inlet port while the power piston is in a position to uncover the exhaust port whereby spent gases may be expelled through the exhaust port by their expansion and the entrance of a new charge.

4. In an internal combustion engine, a power cylinder having an inlet port adjacent one end and an exhaust port intermediate its length, a piston in said cylinder slidable longitudinally thereon and when moved away from the inlet port to a position adjacent the limit of its movement in the said direction uncovering said exhaust port, a valve for said inlet port normally closed, a pump cylinder communicating with the power cylinder through the inlet port, a piston slidable longitudinally in said pump cylinder, a power shaft, a crank for said power shaft, a piston rod extending from the power piston, a pitman pivoted to the piston rod and crank for imparting rotary motion to the power shaft, a piston rod extending from the pump piston, a disk eccentrically mounted upon said power shaft, and a pitman having one end pivoted to the piston rod of the pump piston and its other end loose upon said disk, said disk being disposed upon the power shaft in angular relation to the crank thereof to cause the pump piston to be moved in a direction to deliver a charge of fuel into the power cylinder through the inlet port thereof at a greater rate of speed than the power piston while the power piston is in a position to uncover the exhaust port whereby spent gases may be expelled through the exhaust port by their expansion and the entrance of a new charge.

5. In an internal combustion engine, a power cylinder having an inlet port at each end and an exhaust port intermediate its length, a piston slidable in said cylinder and of a depth to close the exhaust port until in a position adjacent the limit of its movement in either direction, a pump cylinder having outlets at its ends communicating with opposite ends of said power cylinder through said inlet ports, pressure actuated valves controlling passage of fuel into said power cylinder, means for supplying fuel to opposite end portions of said pump cylinder, a piston slidable in said pump cylinder, a power shaft having rotary motion imparted thereto from the power piston, and means for imparting reciprocating motion to the pump piston from said power shaft at varying rates of speed and in timed relation to the power piston whereby to deliver fuel into the power cylinder without appreciable pressure substantially at the time of uncovering the exhaust port and effect displacement of a spent charge through expansion thereof and entrance of a new charge.

In testimony whereof I affix my signature.

THEODORE W. HAINLINE. [L. S.]